Jan. 24, 1967   C. L. MARTIN ETAL   3,299,747
DEVICE FOR RELEASING CUTTING TOOL
Filed March 12, 1965
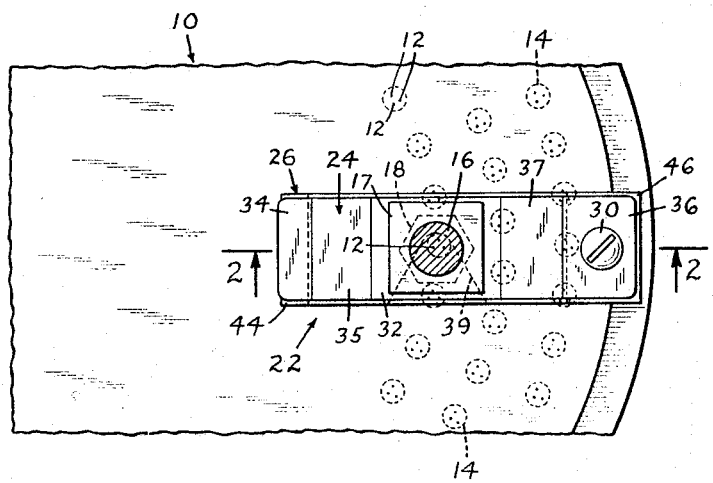
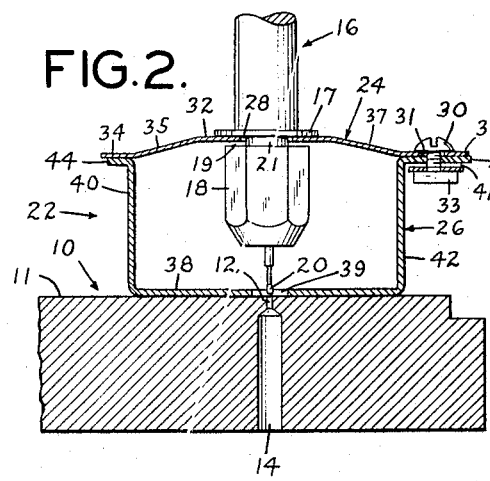
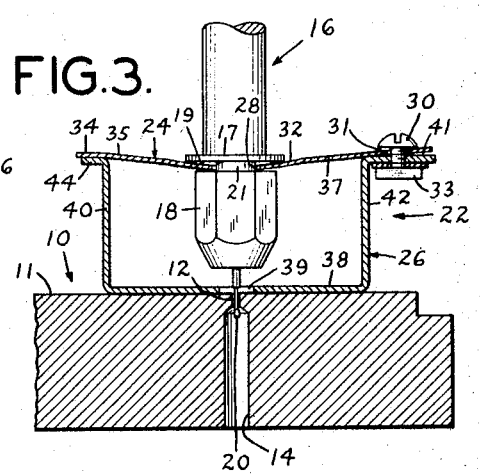
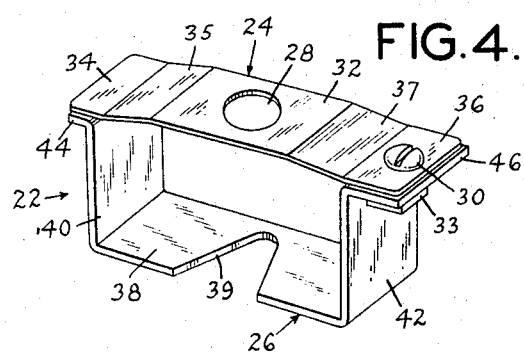
INVENTORS:
CALVIN L. MARTIN
JOHN C. BOLGER
BY
Charles J. Speackle
ATTORNEY

United States Patent Office 3,299,747
Patented Jan. 24, 1967

3,299,747
DEVICE FOR RELEASING CUTTING TOOL
Calvin L. Martin, Richmond, and John C. Bolger, Waynesboro, Va., assignors to Allied Chemical Corporation, New York, N.Y., a corporation of New York
Filed Mar. 12, 1965, Ser. No. 439,233
3 Claims. (Cl. 77—55)

This invention relates to a device utilized as an attachment to a drill press or the like, whose function is to expedite the removal of a cutting tool from a material being serviced. More particularly, it relates to an apparatus which is useful for broaching spinnerets.

Spinneret holes are not smooth after drilling and they may vary in diameter, therefore a broaching operation normally follows the drilling process. Broaching is a term used in spinneret manufacturing to mean an after-treatment to the spinneret capillaries (holes). This after-treatment is sometimes referred to as "ballizing," "burnishing" or "true holing," in addition to broaching.

In all of the above operations, a smooth object is forced through an orifice in order to stretch it and smooth its sides. In "ballizing," a ball bearing is forced through the orifice, while in broaching an elongated round-nosed tool, known as a broaching tool, is forced through. As the broaching tool is forced into the spinneret orifice, the metal expands, then closes on the tool, making it extremely difficult to remove the tool from the spinneret. Usually the structure is of such tenacity that the broaching tool can lift the spinneret plate right off the work bench. In the past a prying bar has been used as a lever to force the broaching tool from the spinneret. Broken or bent tools and damaged spinnerets have resulted.

It is an object of this invention to provide a novel device useful as an attachment to a drill press or the like, its function being to expedite the removal of a cutting tool from a material being serviced, said "cutting" tool being a tool which broaches, reams, or drills a hole.

It is another object of this invention to provide a novel device useful in the art of broaching spinnerets.

It is still another object of this invention to provide a novel device useful in broaching spinnerets which will result in a significant economic advantage through the elimination of broken or bent tools as well as damaged spinnerets.

These and other objects will become apparent and flow from the following specification and claims.

The invention consists of a U-shaped bracket assembly which fits around a spindle or chuck. It is so constructed that its lowermost edge will rest upon the spinneret being treated as the broaching tool approaches the capillary to be serviced. Entry of the broaching tool into the capillary is allowed when sufficient pressure is exerted on the drill chuck or head via an advancing lever, thereby causing the top member of the bracket, a spring steel leaf, to depress downward. The spring steel leaf is depressed until broaching of the orifice is completed, then returns to its relaxed state upon release of the pressure exerted. When the spring steel leaf is attempting to return to its relaxed state, the bracket, by way of the spring leaf action, presses against the spinneret, while the springing action of the leaf pulls the tool out of the broached orifice at the same time. The result is that the spinneret is held in place as the broaching tool slips from the orifice.

It will be seen that the device of this invention can be used for the removal of any cutting tool from material being serviced, not just in the art of broaching spinnerets.

The invention will be more readily understood by reference to the accompanying drawing.

FIGURE 1 shows a plan view of the device while it is resting on a section of spinneret plate to be broached.

FIGURE 2 shows an elevation view along line 2,2 of FIGURE 1 with the spring leaf in a rest position.

FIGURE 3 is similar to FIGURE 2 except that the broaching tool is shown in the counter-bore.

FIGURE 4 shows a perspective view of the device.

Referring to the figures, 10 is a spinneret plate with extrusion face plate 11. 14 is the counter-bore for each set of orifices 12. The device 22 of this invention comprises a stainless steel U-shaped lower member 26, with bottom plate 38, V-shaped slot 39 and sides 40 and 42, said sides ending in flanges 44 and 46. V-shaped slot 39, however, is not limited to a V-shaped, it may be any cut-out portion such as a square or hole. A spring steel leaf 24 rests on flanges 44 and 46 at ends 34 and 36 respectively of said spring, and is attached thereto at flange 46 by means of a nut 30 and bolt 33 through hole 31. 35 and 37 are sloping members of the spring leaf, and 24 with hole 28 is the uppermost member of the spring leaf and runs parallel to bottom plate 38. The nut and bolt are loosely fitted to permit ease of adjustment, so that the lower portion may be rotated away while the device is being positioned or attached to the drill chuck.

Referring to FIGURE 2, a drill press assembly 16 with collar 17 is attached to the spring leaf 24 via a shaft 21 through hole 28 in member 32 and secured by a chuck 18. A broaching tool 20 is inserted into the chuck and appears above orifice 12. The spring leaf is at a rest position and there is space 19 between the spring and the chuck and another space 41 between flange 46 and a washer (not numbered) atop bolt 33, representing a slight play in the nut and bolt assembly. FIGURE 3 shows the device after pressure has been applied forcing the broaching tool 20 through the orifice 12 and into counter-bore 14. It will be seen that the spring leaf has now been deflected downward by means of the pressure exerted by collar 17 on spring leaf 24 at member 32. When the pressure has been released and the spring leaf 24 allowed to come back to its rest position, it will raise the chuck 18 and the broaching tool 20 and simultaneously hold bottom plate 38 firmly in place on extrusion face plate 11, thereby causing the broaching tool to clear the broached orifice without carrying the spinneret plate 10 with it.

We claim:
1. A device for releasing a cutting tool from a material to be serviced while simultaneously preventing movement of said material which comprises a U-shaped member adapted to overlie the material to be serviced, said U-shaped member having a cut-out portion at its center being positioned to permit passage of said cutting tool, said U-shaped portion having outwardly extending members at the upper portion thereof and means associated with said outwardly extending portions for releasing said cutting tool from the material to be serviced while simul- taneously applying a downward force to said U-shaped portion.

2. A device according to claim 1 wherein said cutting tool is a broaching tool affixed to a drill chuck assembly and said material to be serviced is a spinneret.

3. A device according to claim 1 wherein said means for releasing said cutting tool from the material to be serviced while simultaneously applying a downward force to said U-shaped member includes a spring leaf pivotally engaging one end of said outwardly extending portion, said spring leaf member having a hole therein at its center for passage of said cutting tool, and wherein said cutting tool has a projection thereon which contacts the periphery of the spring leaf confining said hole.

References Cited by the Examiner
UNITED STATES PATENTS 1,470,143    10/1923    Buterbaugh _____ 77—55

WILLIAM W. DYER, Jr., *Primary Examiner.*

ANDREW R. JUHASZ, G. A. DOST,
*Assistant Examiners.*